United States Patent
Norimatsu

(10) Patent No.: US 7,323,831 B2
(45) Date of Patent: Jan. 29, 2008

(54) ILLUMINATION DEVICE

(75) Inventor: Hideaki Norimatsu, Toyohashi (JP)

(73) Assignee: Denso Corporation, Kariya, Aichi-pref (JP)

( * ) Notice: Subject to any disclaimer, the term of this patent is extended or adjusted under 35 U.S.C. 154(b) by 0 days.

(21) Appl. No.: 11/729,833

(22) Filed: Mar. 30, 2007

(65) Prior Publication Data

US 2007/0247072 A1    Oct. 25, 2007

(30) Foreign Application Priority Data

Apr. 21, 2006   (JP)   ............................. 2006-118535

(51) Int. Cl.
*G05F 1/00*   (2006.01)
(52) U.S. Cl. .................. 315/294; 315/360; 315/291; 315/297; 315/312; 315/84; 340/815.45; 340/825.63; 340/538.12; 362/466
(58) Field of Classification Search .............. 315/77, 315/82, 84, 291, 292, 294, 297, 307, 360, 315/312, 362, 324; 340/5.72, 527, 815.45, 340/825.57, 825.63, 538.11, 538.12; 362/466, 362/487, 475, 471, 489, 490, 800
See application file for complete search history.

(56) References Cited

U.S. PATENT DOCUMENTS

| | | | | |
|---|---|---|---|---|
| 5,604,407 | A | * | 2/1997 | Andres et al. ................. 315/77 |
| 6,166,496 | A | * | 12/2000 | Lys et al. ................... 315/316 |
| 6,717,376 | B2 | * | 4/2004 | Lys et al. ................... 315/292 |
| 2005/0063194 | A1 | * | 3/2005 | Lys et al. ................... 362/545 |

* cited by examiner

*Primary Examiner*—Haissa Philogene
(74) *Attorney, Agent, or Firm*—Nixon & Vanderhye P.C.

(57) ABSTRACT

An illumination device has an illumination unit which glows when current flows through a load thereof, at least one instruction unit for instructing the illumination unit to glow, a PWM signal generating unit which generates a plurality of PWM signals based on that the instruction unit instructed the illumination unit to glow, and a time difference setting unit for setting a time difference between one of the plurality of PWM signals and an other thereof based on that the instruction unit instructed the illumination unit to glow. The load of the illumination unit is divided into a plurality of portions which are respectively connected with each other in parallel and connected with the PWM signal generating unit. The plurality of PWM signals are generated for currents flowing through the plurality of divided portions of the load of the illumination unit.

12 Claims, 4 Drawing Sheets

FIG. 2
| SORT OF INPUT | DUTY RATIO |
|---|---|
| SW1 | 10% |
| RIGHT DOOR OPENING | 70% |
| LEFT DOOR OPENING | 70% |
| SW2 | 100% |
FIG. 3
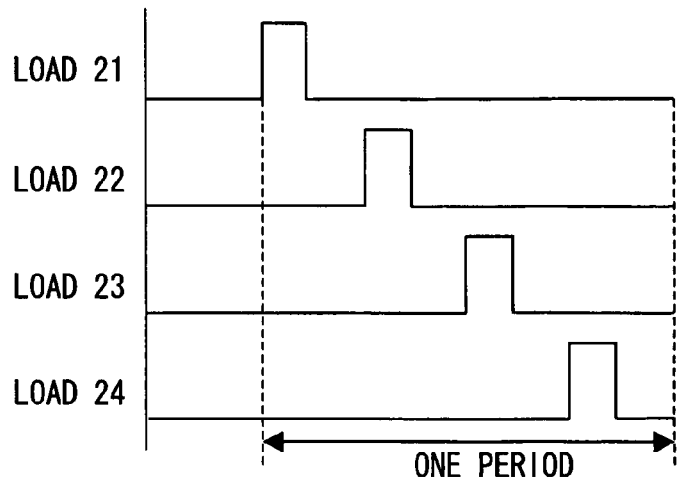
FIG. 4A
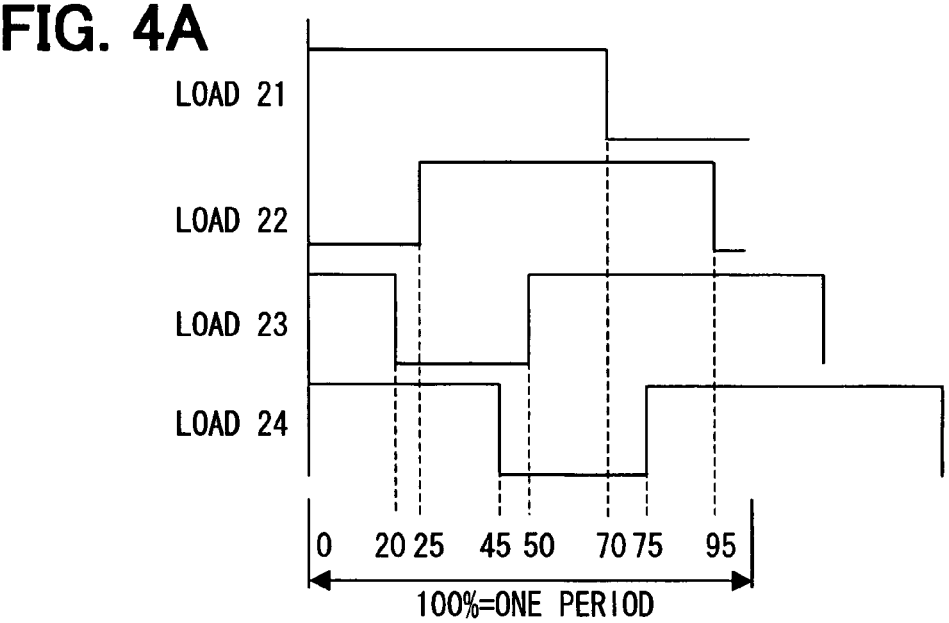
FIG. 4B
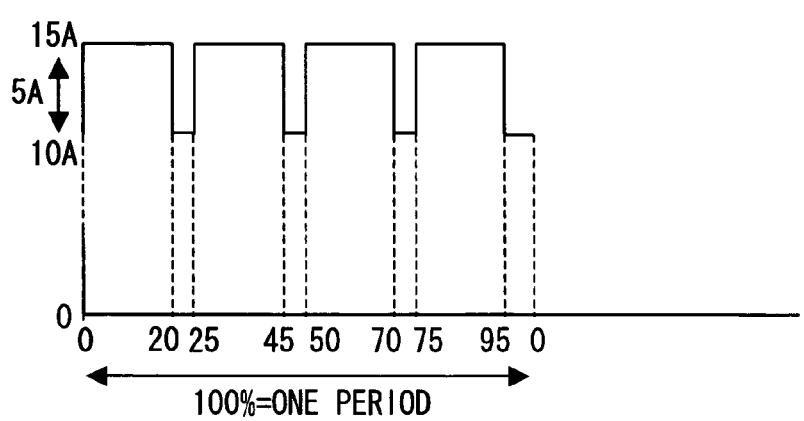

ILLUMINATION DEVICE

CROSS REFERENCE TO RELATED APPLICATION

This application is based on a Japanese Patent Application No. 2006-118535 filed on Apr. 21, 2006, the disclosure of which is incorporated herein by reference.

FIELD OF THE INVENTION

The present invention relates to an illumination device.

BACKGROUND OF THE INVENTION

Generally, for example, an illumination device which is used for a ceiling light, a headlight or the like of a vehicle can be provided with a PWM (pulse width modulation) control. By controlling the illumination device by the PWM control, for example, the brightness of the load of an illumination unit (which practically illuminates) of the illumination device can be readily changed. Specifically, the brightness can be adjusted by changing a pulse width with respect to one period. Moreover, the illumination unit can gradually become bright or dark, by gradually changing the pulse width into a target pulse width. The control of the pulse width in this case will be called a fade control in the later description.

However, in the case where the load of the illumination unit is supplied with electrical current by the PWM control to be made illuminate (glow), there will occur a violent variation of the current at the time of the pulse rise and the pulse decay. Due to the variation of the current, electromagnetic wave (noise) occurs to adversely affect other electronic components. For example, a malfunction will be caused. Particularly, in the case where the current flowing through the load of the illumination unit is large, the electromagnetic wave will become strong.

SUMMARY OF THE INVENTION

In view of the above-described disadvantage, it is an object of the present invention to provide an illumination device where electromagnetic wave (noise) due to a rise and a decay of pulse current is reduced.

According to the present invention, an illumination device has an illumination unit which glows when current flows through a load thereof, at least one instruction unit for instructing the illumination unit to glow, a PWM signal generating unit which generates a plurality of PWM signals based on that the instruction unit instructed the illumination unit to glow, and a time difference setting unit for setting a time difference between one of the plurality of PWM signals and an other thereof based on that the instruction unit instructed the illumination unit to glow. The load of the illumination unit is divided into a plurality of portions which are respectively connected with each other in parallel and connected with the PWM signal generating unit. The plurality of PWM signals are generated for currents flowing through the plurality of divided portions of the load of the illumination unit.

In this case, the load of the illumination unit is divided into the multiple portions which are connected with each other in parallel. Thus, the currents flowing through the multiple portions of the load can be separately controlled. Because the time difference is set between one of the multiple PWM signals and the other thereof, the currents flowing through the multiple portions of the load will not simultaneously end even when the currents flowing through the multiple portions of the load simultaneously start. Therefore, the rise amount and the decay amount of the pulse current generated by the PWM signal can be decreased, thus reducing electromagnetic wave (noise) due to the rise and the decay of the pulse current.

Preferably, the load of the illumination unit is divided into the plurality of portions which respectively have loads substantially equal to each other.

Thus, the currents flowing through the multiple portions of the load are substantially equal to each other. Therefore, the electromagnetic wave (noise) related to the rise amounts of the pulse currents flowing through the multiple portions of the load can become substantially even. Similarly, the electromagnetic wave (noise) due to the decay amounts of the pulse currents with respect to the multiple portions of the load becomes substantially even. Thus, deleterious effect on other electronic apparatuses can be reduced.

More preferably, the time difference setting unit sets the time difference in such a manner that intervals between the plurality of PWM signals are substantially equal to each other.

Thus, the intervals between the rises of the pulse currents and the intervals between the decays of the pulse currents can be made equal. Therefore, intervals of the generation of the electromagnetic (noise) due to the rises of the pulse currents and intervals of the generation of the electromagnetic wave (noise) due to the decays of the pulse currents can become substantially equal. Thus, deleterious effect on other electronic apparatuses can be reduced.

More preferably, the illumination device further has a memorization unit in which a plurality of duty ratios of the PWM signals generated by the PWM signal generating unit are memorized corresponding to the plurality of the instruction units. Values of the plurality of duty ratios are different from each other. The PWM signal generating unit determines a target duty ratio of the generated PWM signal from the plurality of duty ratios memorized in the memorization unit, based on which of the plurality of instruction units instructed the illumination unit to glow.

For example, the multiple instruction units can be constructed of switches for making a ceiling light (illumination unit) of a vehicle glow when a door of the vehicle is opened/closed. Thus, the illumination unit can be made glow with the multiple duty ratios.

BRIEF DESCRIPTION OF THE DRAWINGS

Other objects, features and advantages of the present invention will become more apparent from the following detailed description made with reference to the accompanying drawings, in which:

FIG. 2 is a table showing target duty ratios with respect to inputs according to the first embodiment;

FIG. 3 is a graph showing PWM signals for load portions when a duty ratio is substantially equal to 10% according to the first embodiment;

FIG. 4A is a graph showing the PWM signals for the load portions when the duty ratio is substantially equal to 70% according to the first embodiment, and FIG. 4B is a graph showing rise and decay of pulse current during one period according to the first embodiment;

DETAILED DESCRIPTION OF THE EXAMPLED EMBODIMENTS

First Embodiment

An illumination device 100 according to a first embodiment of the present invention will be described with reference to FIG. 1-FIG. 5. The illumination device 100 can be suitably used for, for example, a courtesy light or a headlight of a vehicle or the like which is made illuminate (glow) by a PWM control. The illumination device 100 can be suitably used when being arranged near other electronic apparatus.

Figure 1:
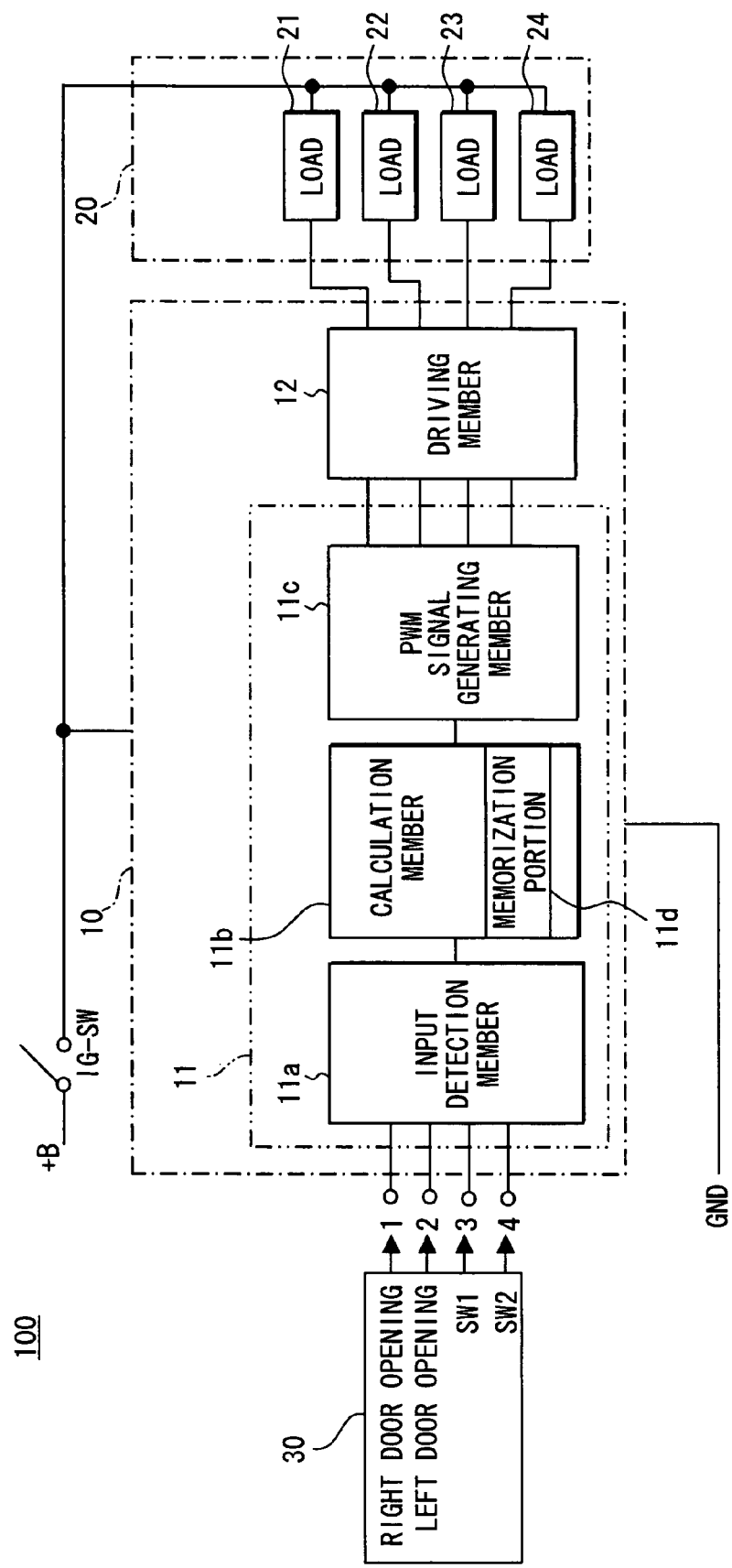
FIG. 1 is a block diagram showing a construction of an illumination device according to a first embodiment of the present disclosure.

As shown in FIG. 1, the illumination device 100 has a control unit 10, and an illumination unit 20. The control unit 10 includes a microcomputer 11 and a driving member 12. The load of the illumination unit 20 which can illuminate is divided into multiple load portions (e.g., four load portions 21-24) which can respectively have loads equal to each other, to reduce electromagnetic wave (noise) in response to the rise and decade of pulse current. That is, the load of the illumination unit 20 can be evenly divided into four parts.

The control unit 10 is provided to control the illumination of the illumination unit 20. The microcomputer 11 can be constructed of a well-known computer which has therein a CPU, a ROM, a RAM, an I/O and a bus line (for connecting CPU, ROM, RAM, and I/O) which are not shown.

The microcomputer 11 includes an input detection member 11a, a calculation member 11b (time difference setting unit) and a PWM signal generating member 11c. The PWM signal generating member 11c and the driving member 12 construct a PWM signal generating unit. In this case, the load portions 21-24 are connected with each other in parallel, and connected with the PWM signal generating unit.

At least one instruction unit 30 (which also functions as abort unit) is provided to instruct the illumination unit 20 to light on or light out. Specifically, the instruction unit 30 instructs the illumination unit 20 to light on or light out according to an instruction via opening/closing of a left door or a right door of the vehicle, or an instruction via operation of a predetermined switch SW1 or SW2.

Multiple input terminals (e.g., four input terminals 1-4) are arranged at the input side of the input detection member 11a to receive multiple (e.g., four) sorts of input signals. The input detection member 11a is provided to detect the input signal from the input terminals 1-4.

According to this embodiment, the signal inputted to the input terminal 1 is a signal detecting the opening/closing of the right door of the vehicle. The signal inputted to the input terminal 2 is a signal detecting the opening/closing of the left door of the vehicle. The signal inputted to the input terminal 3 is a signal which is generated due to the operation of the switch SW1. The signal inputted to the input terminal 4 is a signal which is generated due to the operation of the switch SW2. The information indicating which signal the signal inputted to the input terminals 1-4 corresponds to is beforehand memorized in a memorization portion 11d of the calculation member 11b. In this case, the input signal detected by the input detection member 11a can be sent to the calculation member 11b.

The calculation member 11b determines whether or not the input signal from the input detection member 11a is sent thereto (that is, whether or not input signal from input terminals 1-4 is inputted thereto), and determines the sort of the input signal with reference to the information in the memorization member 11d in the case where the input signal is sent to the calculation member 11b.

The relationship between the sort of the input signal and a duty ratio is shown in FIG. 2. In this case, the information showing the relationship is beforehand memorized in the memorization member 11d (memorization unit). Thus, the duty ratio of the PWM signal can be determined with reference to the information in the memorization member 11d, according to the sort of the input signal.

Moreover, the interval for sending the PWM signals for the load portions 21-24 can be determined. In this case, kinds of information are sent to the PWM signal generating member 11c. The intervals for sending the PWM signals to the load portions 21-24 can be set equal to each other. That is, the rises of the pulses are shifted in time (e.g., ¼ period) from each other.

The PWM signal generating member 11c generates the PWM signal of the predetermined duty ratio based on the information sent from the calculation member 11b. Thus, the PWM signal is sent to the driving member 12, in such a manner that the rises of the pulses of the PWM signal are shifted in time (e.g., ¼ period) from each other.

Specifically, in the case where the one period is set to be 100%, the PWM signals which respectively have the rises of the first pulses at the time of 0%, 25%, 50% and 75% are sent. That is, the four PWM signals which respectively deviate from each other at ¼ period are sent to the driving member 12.

The driving member 12 can amplify the PWM signals from the PWM signal generating member 11c to make a switching element such as a transistor element or the like become ON, so that current flows through the load portions 21-24.

The illumination unit 20 is the part which can practically illuminate, and can be constructed of a LED. According to this embodiment, the load of the illumination unit 20 can be divided into the four parts which are equal to each other. One of the two terminals of each of the load portions 21-24 can be connected with a battery through an ignition switch (IG-SW), and the other thereof can be connected with a ground (GND) through the driving member 12.

As described above, with reference to FIG. 2, the duty ratio is beforehand determined for the input terminals 1-4. For example, as shown in FIG. 3, when the duty ratio is set to be 10%, the pulses of the PWM signals for the load portions 21-24 do not overlap each other during the one period.

That is, each of the rise amount and the decay amount of the pulse current flowing through each of the load portions 21-24 corresponding to the PWM signal is ¼ of the current in the case where the load of the illumination unit 20 is not divided.

Thus, the caused electromagnetic wave (noise) in the case the load of the illumination unit 20 is divided into the four parts will be reduced as compared with the case where the load of the illumination unit 20 is not divided.

FIG. 4A shows the PWM signals sent to the load portions 21-24 in the case where the duty ratio is 70%. With reference to FIG. 4A, the PWM signals deviates from each other by ¼ period. In the case where the duty ratio is 70% and the one period is set to be 100%, the pulse parts of the PWM signals overlap each other during 0-20%, 25%-45%, 50%-70% and 75%-95% of the period. Correspondingly, FIG. 4B (in which the longitudinal axis represents the current and the lateral axis represents the time) shows the rises and the decays of the pulse current during the one period for the illumination unit 20.

With reference to FIG. 4B, in the case where the one period is set as 100%, the total current flowing through the load portions 21-24 is substantially equal to 15 A during 0-20%, 25%-45%, 50%-70% and 75%-95% of the period and is substantially equal to 10 A during 20-25%, 45%-50%, 70%-75% and 95%-0% of the period.

In this case, although there exist rises and decays (of pulse current) four times during the one period, the current flowing through the load portion 21-24 of the illumination unit 20 is substantially equal to 5 A at the pulse part. Therefore, the electromagnetic wave (noise) due to the rise and decay of the pulse current can be reduced, as compared with the electromagnetic wave (noise) due to the rise and decay of the current (20A) flowing through the illumination unit 20 in the case where the load of the illumination unit 20 is not divided.

On the other hand, the illumination unit 20 of the illumination device 100 is controlled in such a manner that the brightness of the illumination unit 20 gradually varies when the illumination unit 20 is lit up and lit out. The process performed by the microcomputer 11 will be described with reference to FIG. 5. In this case, the duty ratios for the input signals can be set as shown in FIG. 2, for example.

Figure 5:
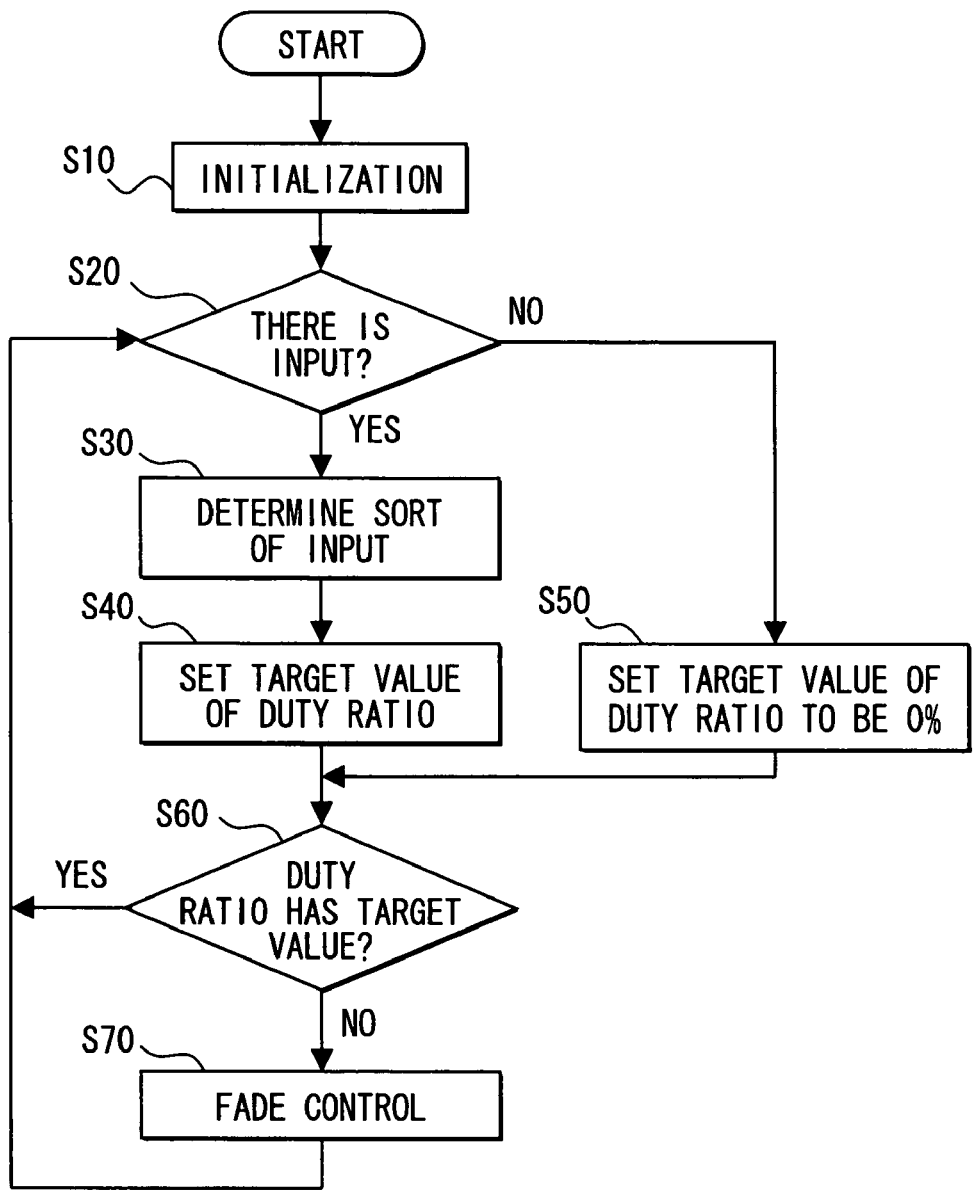
FIG. 5 is a flow chart showing a process for making an illumination unit light up/light out by a fade control according to the first embodiment.

When the ignition switch (IG-SW) becomes ON, the process shown in FIG. 5 will be started. At first, the initialization is performed at step S10. For example, the correspondence relation between the input signals from the input terminal 1-4 and the instructions (e.g., instructions via opening/closing of left door or right door, and instructions via operation of switch SW1 or SW2) from the instruction unit 30 is set, and the PWM signals for the load portions 21-24 are shifted from each other by ¼ period.

Next, at step S20, it is checked whether or not there is an input signal to the input terminal 1-4. That is, the calculation member 11b determines whether or not there is a signal inputted to the input terminal 1-4, according to whether or not the signal from the input detection member 11a is sent to the calculation member 11b.

In this case, when there is the input signal to the input terminal 1-4 (that is, YES is determined at step S20), step S30 will be performed. At step S30, the calculation member 11b determines the sort of the input signal with reference to the information in the memorization member 11d, based on from which of the input terminals 1-4 the input detection member 11a received the input signal.

Then, at step S40, the duty ratio which is targeted is set based on the table (with reference to FIG. 2) of the correspondence relation between the duty ratios and the sorts of the input signals. Moreover, in the case where there are the multiple input signals, the target value of the duty ratio is set to be the maximum one of the duty ratios which are respectively set for the input signals. For example, in the case where the input signals are inputted to the input terminals 1 and 3, the target value is set to be equal to the duty ratio (70%) corresponding to the input terminal 3.

Then, at step S60, the calculation member 11b determines whether or not the current duty ratio has the target value. When the current duty ratio does not reach the target value (that is, NO is determined at step S60), step S70 will be performed.

At step S70, the calculation member 11b increases/decreases the duty ratio at an interval which corresponds to the target value so as to approach the target value. Thus, the fade control is performed to provide an instruction so that the signal of the duty ratio is generated in the PWM signal generating member 11c. Moreover, accompanying with that, an instruction is provided so that the periods of the PWM signals for the load portions 21-24 deviate from each other by ¼ period.

Thereafter, the process shown in FIG. 5 is repeated from step S20, so that the fade control is performed until the duty ratio is substantially equal to the target value.

In this case, the interval corresponding to the target duty ratio can be set in such a manner that it takes, for example, 2 sec to reach the target duty ratio. Alternatively, the duty can be also increased/decreased at a predetermined interval irrespectively with the duty ratio, to approach the target duty ratio. Moreover, the interval of the fade control can be also shortened, so that the illumination unit 20 can be instantly lit-up and lit-out.

On the other hand, when the current duty ratio is substantially equal to the target value (that is, YES is determined at step S60), the process will be repeated from step S20.

On the other hand, at step S20, in the case where there is not an input signal from the input terminal 1-4, step S50 will be performed. At step S50, the target value of the duty ratio is set to be 0%. For example, in the case where there is not an input signal, the illumination unit 20 is made lighting out without being changed. On the other hand, when the illumination unit 20 lights up, the fade control is performed at step S70 so that the illumination unit 20 is gradually lit out in the case where the target duty ratio is set to be 0%.

According to this embodiment, the load of the illumination unit 20 which can illuminate is evenly divided, to reduce the electromagnetic wave (noise) due to the rise and decay of the pulse current of the PWM signal. The periods for the PWM controls of the load portions 21-24 of the illumination unit 20 are shifted from each other in such a manner the time difference (interval) therebetween becomes same.

Therefore, the rise amount and the decay amount of the pulse current flowing through all of the load portions 21-24 of the illumination unit 20 can be reduced as compared with the pulse current provided with a general PWM control. Thus, the electromagnetic wave (noise) can be reduced as compared with an illumination device provided with the general PWM control.

In this case, the load portions 21-24 are connected with a single power source. Therefore, the currents flowing through the load portions 21-24 are equal to each other. Thus, as compared with the case where the load of the illumination unit 20 is not divided, the current flowing through each of the load portions 21-24 is decreased and the total current flowing through all of the load portions 21-24 is not changed. Therefore, the brightness of the illumination unit 20 can be maintained.

Second Embodiment

Figure 6A:
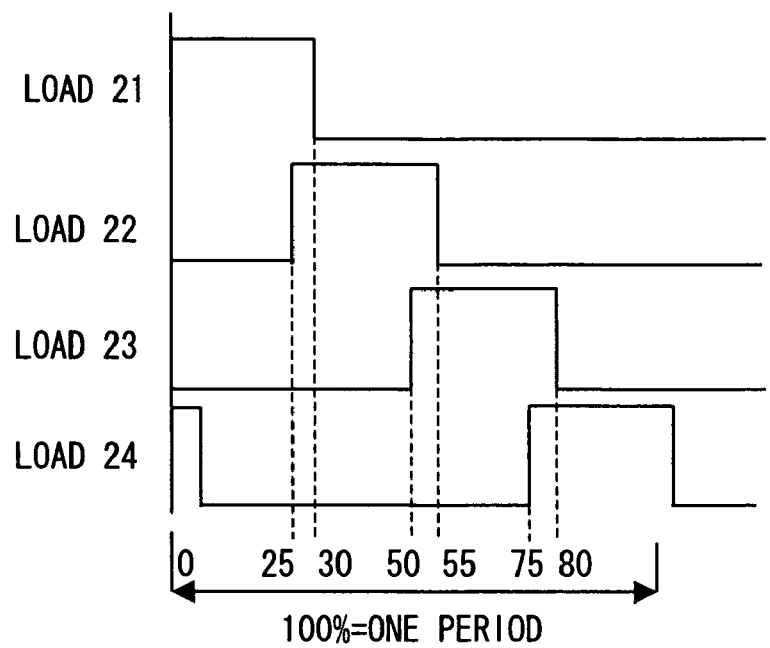
FIG. 6A is a graph showing PWM signals for load portions when a duty ratio is substantially equal to 30% according to a second embodiment of the present invention.
Figure 6B:
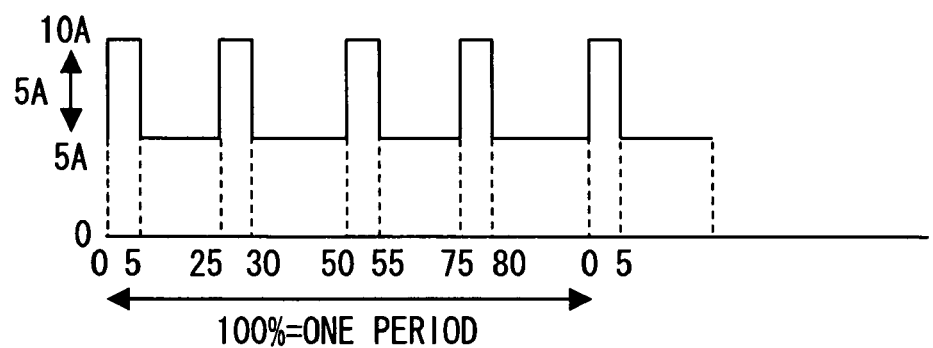
FIG. 6B is a graph showing rise and decay of pulse current during one period according to the second embodiment.

In the above-described first embodiment, the duty ratios are set for the input signals with reference to FIG. 2. However, the setting of the duty ratio is not limited to that. For example, FIG. 6A shows the PWM signals sent to the load portions 21-24 in the case where the duty ratio is set to be 30%. FIG. 6B (in which the longitudinal axis represents the current and the lateral axis represents the time) shows the rises and decays of the pulse current during the one period for the illumination unit 20.

In the case where the one period is set as 100%, the total current flowing through the load portions 21-24 is substantially equal to 10 A during 0-5%, 25%-30%, 50%-55% and 75%-80% of the period and is substantially equal to 5 A during 5-25%, 30%-50%, 55%-75% and 80%-0% of the period.

In this case, the rise/decay amount of the pulse current is the same as that in the case where the duty ratio is set 70%, to be 5 A. Thus, the electromagnetic wave (noise) due to the rise and decay of the pulse current can be also reduced as compared with the case where the load of the illumination unit 20 is not divided.

Other Embodiment

Although the present invention has been fully described in connection with the preferred embodiments thereof with reference to the accompanying drawings, it is to be noted that various changes and modifications will become apparent to those skilled in the art.

For example, in the above-described embodiment, the fade control is performed so that the duty ratio gradually reaches the target value. However, the interval of the fade control can be also set to be 0 sec, so that the brightness which is targeted can be instantly provided.

Moreover, in the above-described embodiment, the load of the illumination unit 20 is evenly divided. However, the load can be also divided non-uniformly. In this case, the electromagnetic wave (noise) can be also reduced as compared with the illumination device provided with the general PWM control.

Furthermore, in the above-described embodiment, the periods of the PWM signals sent to the load portions 21-24 are shifted from each other at an equal interval. However, the periods of the PWM signals sent to the load portions 21-24 can be also shifted from each other at different intervals. In this case, the electromagnetic wave (noise) can be also reduced as compared with the illumination device provided with the general PWM control.

Moreover, the calculation member 11b sets the time difference (interval) of the PWM signals for the load portions 21-24, before the PWM signals are generated. However, the calculation member 11b can also set the time difference of the PWM signals for the load portions 21-24, after the PWM signals are generated.

Such changes and modifications are to be understood as being in the scope of the present invention as defined by the appended claims.

What is claimed is:

1. An illumination device comprising:
    an illumination unit which glows when current flows through a load thereof;
    at least one instruction unit for instructing the illumination unit to glow;
    a PWM signal generating unit which generates a plurality of PWM signals based on that the instruction unit instructed the illumination unit to glow,
    the load of the illumination unit being divided into a plurality of portions which are respectively connected with each other in parallel and connected with the PWM signal generating unit,
    the plurality of PWM signals being generated for currents flowing through the plurality of divided portions of the load of the illumination unit; and
    a time difference setting unit for setting a time difference between one of the plurality of PWM signals and another thereof based on that the instruction unit instructed the illumination unit to glow.

2. The illumination device according to claim 1, wherein the load of the illumination unit is divided into the plurality of portions which respectively have loads substantially equal to each other.

3. The illumination device according to claim 1, wherein the time difference setting unit sets the time difference in such a manner that intervals between the plurality of PWM signals are substantially equal to each other.

4. The illumination device according to claim 1, further comprising
    a memorization unit in which a plurality of duty ratios of the PWM signals generated by the PWM signal generating unit are memorized corresponding to the plurality of the instruction units, values of the plurality of duty ratios being different from each other, wherein
    the PWM signal generating unit determines a target duty ratio of the generated PWM signal from the plurality of duty ratios memorized in the memorization unit, based on which of the plurality of instruction units instructed the illumination unit to glow.

5. The illumination device according to claim 4, wherein the PWM signal generating unit generates the PWM signal having the maximum duty ratio in the plurality of duty ratios which are memorized in the memorization unit corresponding to the plurality of instruction units, in the case where the instruction units substantially simultaneously instructed the illumination unit to glow.

6. The illumination device according to claim 1, further comprising
    an abort unit for instructing the illumination unit to abort illumination, wherein
    the PWM signal generating unit changes a duty ratio of the generated PWM signal into zero, when the illumination unit is instructed to abort illumination by the abort unit.

7. The illumination device according to claim 4, further comprising
    an abort unit for instructing the illumination unit to abort illumination, wherein the PWM signal generating unit changes the duty ratio of the generated PWM signal into zero, when the illumination unit is instructed to abort illumination by the abort unit.

8. The illumination device according to claim 5, further comprising an abort unit for instructing the illumination unit to abort illumination, wherein the PWM signal generating unit changes the duty ratio of the generated PWM signal into zero, when the illumination unit is instructed to abort illumination by the abort unit.

9. The illumination device according to claim 1, wherein the PWM signal generating unit gradually changes a duty ratio of the PWM signal until the duty ratio is substantially equal to a target duty ratio.

10. The illumination device according to claim 4, wherein the PWM signal generating unit gradually changes the duty ratio until the duty ratio is substantially equal to a target duty ratio.

11. The illumination device according to claim 5, wherein the PWM signal generating unit gradually changes the duty ratio until the duty ratio is substantially equal to a target duty ratio.

12. The illumination device according to claim 6, wherein the PWM signal generating unit gradually changes the duty ratio until the duty ratio is substantially equal to a target duty ratio.

* * * * *